United States Patent Office 2,742,990
Patented Apr. 24, 1956

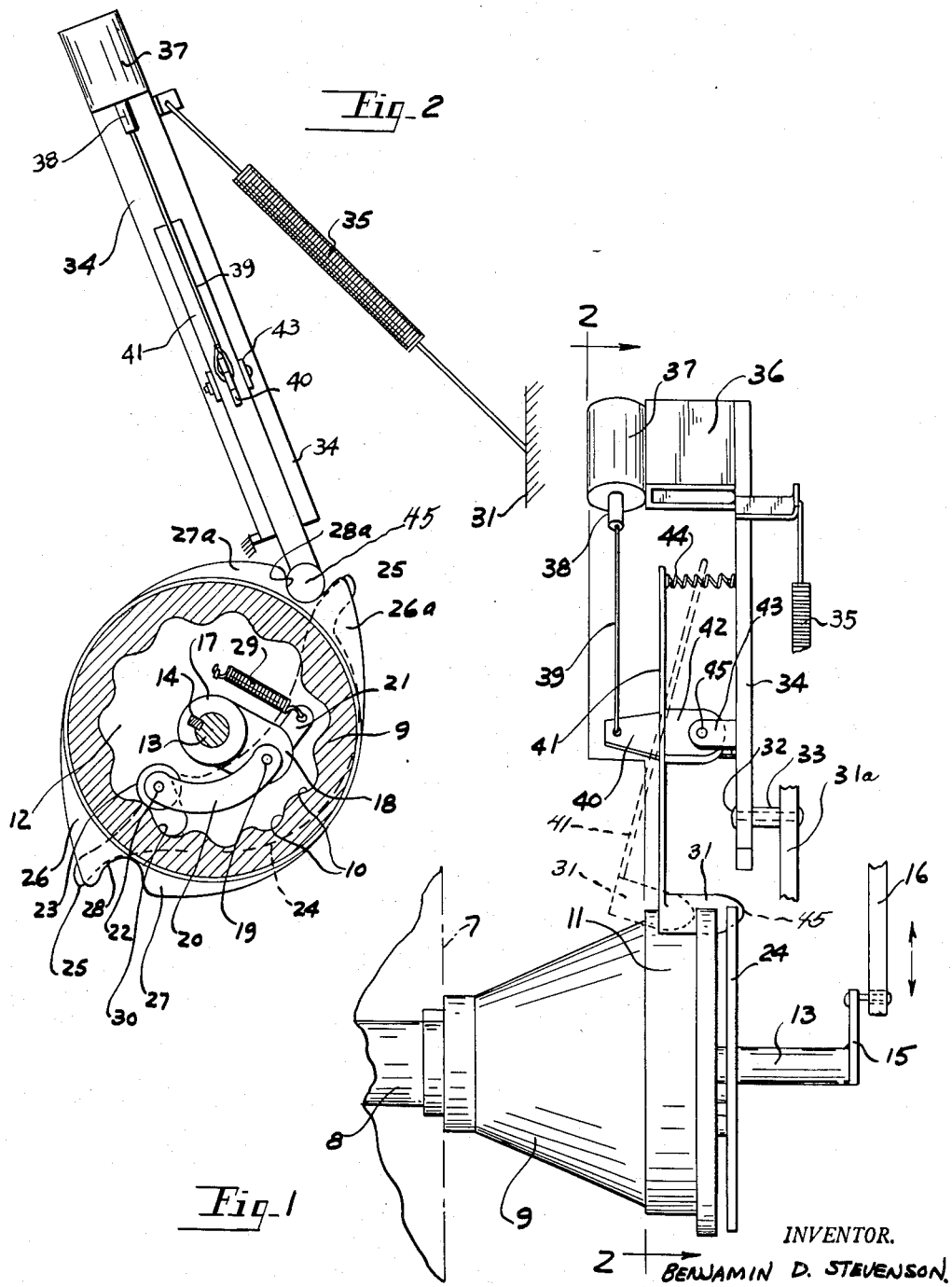

2,742,990

CLUTCH ACTUATOR TRIP

Benjamin D. Stevenson, Flushing, Mich.

Application February 19, 1951, Serial No. 211,683

6 Claims. (Cl. 192—62)

My invention relates to a new and useful improvement in a clutch actuator trip adapted for use in connection with different farm implements, such as plows, drills, cultivators and the like. In the use of such instruments a supporting frame is mounted on traction wheels and the implement is carried on the supporting frame. The implement is so mounted on the supporting frame that it may be raised and lowered relatively to the earth over which it may be drawn by a suitable source of power, generally a tractor. When desired the operator will trip a mechanism which allows a clutch to close or move to operative position, and the lifting mechanism is then actuated through the traction wheels so that the implement may be either raised or lowered. This tripping is generally effected by an arm to which a cable is attached, and which is extended to a position convenient to the operator, so that upon pulling on the cable the tripping may be effective.

The present invention has as its object, the provision of a trip so arranged and constructed that it may be easily and quickly operated by a solenoid, the solenoid being mounted adjacent to the trip and the operator being in a position accessible to a switch for controlling the circuit to the solenoid.

It is another object to provide an electrically operated solenoid for effecting a rocking of a beam on which the control member is mounted.

Another object is to provide a construction so that upon an operation of the solenoid an abutment or locking member will be partially moved to releasing position, and its further movement effected upon rotation of the clutch member with which associated.

It is another object of the invention to provide an abutment or locking member, which may be moved axially of the clutch member with which associated, to move to operative or inoperative position.

Other objects will appear hereinafter.

It is recognized that various modifications and changes may be made in the detail of structure illustrated without departing from the present invention, and it is intended that the present disclosure shall be considered but the preferred embodiment.

Forming a part of this specification are drawings in which:

Fig. 1 is an elevational view of the invention, showing it applied, with the parts of the structure to which it is applied shown in side elevation, and with parts broken away, Fig. 2 is a sectional view taken on line 2—2 of Fig. 1.

In the drawings I have illustrated a part of the structure with which the invention is applied, the numeral 7 representing a traction wheel which is fixedly mounted on a tubular shaft 8, extending outwardly from a clutch housing 9. The open end of the clutch housing is provided on its inner surface with a plurality of recesses 10. Embracing the open end of this housing is a cup-shaped member 11, having a bottom 12. Extended through the tubular shaft 8 and through the housing 9 is a shaft 13, which also extends through the bottom 12 and which is keyed thereto by the key 14. Fixed to the end of the shaft and radiating outwardly therefrom is crank 15, which is pivotally connected to the lifting bar 16, which serves to lift the implement to be operated upon. Formed integral with the plate 12 is a hub 17 extending outwardly from which and formed integral therewith is a bracket or lug 18. Pivoted at one end to the lug 18 by means of the pin 19, is a link 20. This pin 19 also serves to pivot the link 21, the link 21 being longer than and in alignment with the link 20. Rotatably mounted between the links 20 and 21 at one of their ends is a roller 23. The pin 19 also serves to pivotally mount the plate 24 exterior of the cup-shaped member. This plate 24 is provided at its opposite ends with a nose 25. Extending outwardly from the periphery of the cup-shaped member 11, at the base thereof, is a flange 26 separated from a smaller flange 27, by the recess 28. A similar flange 26a, similar to the flange 26, also projects outwardly from the periphery and is separated from the flange 27a, which is similar to flange 27, by the notch or recess 28a. Fastened at one end to the plate 12 is a spring 29, the other end of which is attached to the link 21. The construction is such that the spring 29 serves to normally tend to rock the links 21 and 20 into such a position that the roller 23 will engage in one of the recesses 10. When so engaged, the plate 12 will rotate in unison with the clutch housing 9 and thus the shaft 13 will be rotated to effect the necessary operation through the crank 15. The pin 22 extends through a slot 30 formed in the plate 12 and also through the plate 24 so that the plate 24 will rock on the pin 19 in unison with a rocking of the links 20 and 21. An abutment stud 31 is adapted to engage in the recess 28 and this is engaged by the end portion 25 of the plate 24 so that the member 31 will prevent the plate from rocking so long as this abutment stud is in the notch 28a or 28. In order to have an operation of the mechanism, it is necessary that the abutment stud be moved to a position where it no longer engages in a recess 28a or 28 so as to permit this plate 24 to rock. The structure so far illustrated is conventional and of a well known type and, of itself, forms no part of the present invention.

Supported on the frame 31a, by means of the pivot pin 32 and to the spacer 33, is an arm 34. Connected at one end the arm 34 is a spring 35, the other end of which is connected to the frame 31a. Mounted by a suitable bracket 36 on the arm 34 is an electric solenoid 37 having a plunger or core 38 which is attached by a rod 39 to the lug 40 extending outwardly from the plate 41 which carries a pair of lugs 42 pivotally mounted on the lugs 43 fixedly mounted on the frame 34. The lock stud 31 is fixedly mounted on the end of the plate 41 and this plate 41 is maintained normally in vertical position by means of a spring 44 which bears at one end against the plate 41 and at the opposite end against the frame 34. This locking stud has a pointed end or nose 45, and in its movements into and out of the recesses, moves axially of the clutch member.

The solenoid 37 is energized from a suitable source of electrical energy through a circuit, which is not shown, and in which is positioned a switch which is accessible to the operator, which would generally be near the seat of the tractor used for drawing the implement. Upon energizing the solenoid, the stud or plunger 38 would move inwardly of the solenoid 37 and thus rock the plate 41 on the pivot 45. This movement will be sufficient to move the lock stud 41 out of position for engaging, at its tapered position, the end 25 of the plate 24, but would not move it clear of the recesses 26a or 27a, or 26 or 27, whichever the case may be. However, the plate 24 bearing at its end against the tapered position of the lock stud 31 would force it to left of Fig. 1, causing the plate 41 to rock further against the compression of the spring 44 until the lock stud 41 would clear the plate 24. The lock stud 31 would then ride upon the periphery of the member 11, the spring 35 maintaining the arm 34 rocked in a direction to maintain this peripheral contact.

It is thus seen that I have provided a mechanism whereby the locking stud is moved by the solenoid a slight distance toward releasing position and that the further movement toward releasing position is effected through the plate 24, engaging the tapered part of the locking stud. This makes it possible to obtain a quicker action, use a solenoid of shorter movement and use a smaller solenoid, with a resulting economy in manufacture.

The invention has proved itself most highly efficient in use and quick in action.

What I claim is:

1. In a device of the class described adapted for use with a structure having a rotatable clutch member having on its periphery a recess: a support; an arm rockably mounted on said support and rockable in a plane parallel to the axis of the clutch member; an abutment member engageable in said recess and carried on said arm and movable axially of said clutch member into and out of engagement with said recess upon rocking of said arm; a resilient member engageable with said arm for normally maintaining said arm in a position for retaining said abutment member in asid recess; a solenoid; a plunger in said solenoid; a connecting member connecting said plunger to said rockable arm and adapted for rocking said arm against the pressure of said resilient member upon energizing of said solenoid.

2. In a device of the class described adapted for use with a structure having a rotatable clutch member having on its periphery a recess: a support; an arm rockably mounted on said support; an abutment member engageable in said recess and carried on said arm and movable axially of said clutch member into and out of engagement with said recess upon rocking of said arm; a resilient member engageable with said arm for normally maintaining said arm in a position for retaining said abutment member in said recess; a solenoid; a plunger in said solenoid; a connecting member connecting said plunger to said rockable arm and adapted for rocking said arm against the pressure of said resilient member upon energizing of said solenoid, said abutment member, at its free end being tapered.

3. In a device of the class described adapted for use with a structure having a rotatable clutch member having a recess on its periphery: a swingable supporting member pivoted intermediate its ends; a spring for normally resisting swinging movement of said supporting member in one direction said supporting member being swingable in a plane normal to the axis of the clutch member; an arm rockably mounted on said supporting member and rockable in a plane parallel to the axis of the clutch member; an abutment member carried by one end of said rockable arm and engageable in said recess and extending axially of the clutch member; a solenoid carried by said swingable arm; a plunger for said solenoid movable inwardly and outwardly thereof; a connection between said plunger and said rockable arm for rocking said rockable arm in one direction, for moving said abutment member axially of said clutch member outwardly of said recess upon energizing of said solenoid.

4. In a device of the class described adapted for use with a structure having a rotatable clutch member having a recess on its periphery: a swingable supporting member pivoted intermediate its ends; a spring for normally resisting swinging movement of said supporting member in one direction; an arm rockably mounted, intermediate its ends, on said supporting member; an abutment member carried by one end of said rockable arm and engageable in said recess and extending axially of the clutch member, said arm being rockable in a plane parallel to the axis of the clutch member; a solenoid carried by said swingable arm; a plunger for said solenoid movable inwardly and outwardly thereof; a connection between said plunger and said rockable arm for rocking said rockable arm in one direction for moving said abutment member axially of said clutch member outwardly of said recess upon energizing of said solenoid; and a spring for rocking said rockable arm in the opposite direction.

5. In a device of the class described adapted for use with a structure having a rotatable clutch member having a recess on its periphery and associated with a supporting frame: an arm swingably mounted adjacent one end on said frame; a spring connected at one end to said arm and at its opposite end to said frame for resisting swingable movement of said arm in one direction and normally maintaining said arm swung in the opposite direction; a rockable arm rockably mounted on said swingable arm and extending therewith and rockable in a plane parallel to the axis of the clutch member toward and away from said first-mentioned arm; an abutment member carried by one end of said rockable arm and swingable axially of said clutch member into and out of engagement with said recess; a solenoid mounted on said swingable arm; a plunger on said solenoid movable longitudinally of said solenoid; and a connecting member for connecting said plunger to said rockable arm for rocking said rockable arm in one direction upon energizing of said solenoid.

6. In a device of the class described adapted for use with a structure having a rotatable clutch member having a recess on its periphery and associated with a supporting frame: an arm swingably mounted adjacent one end on said frame; a spring connected at one end to said arm and at its opposite end to said frame for resisting swingable movement of said arm in one direction and normally maintaining said arm swung in the opposite direction; a rockable arm rockably mounted on said swingable arm and extending in alignment therewith and rockable in a plane parallel to the axis of the clutch member toward and away from said first-mentioned arm; an abutment member carried by one end of said rockable arm and swingable axially of said clutch member into and out of engagement with said recess; a solenoid mounted on said swingable arm; a plunger on said solenoid movable longitudinally of said solenoid; a connecting member for connecting said plunger to said rockable arm for rocking said rockable arm in one direction upon energizing of said solenoid, and a spring for rocking said rockable arm in the opposite direction.

References Cited in the file of this patent

UNITED STATES PATENTS

| 2,201,118 | Beede | May 14, 1940 |
| 2,517,172 | Bjerre et al. | Aug. 1, 1950 |
| 2,577,230 | Chipman | Dec. 4, 1951 |
| 2,606,476 | Waller et al. | Aug. 12, 1952 |

FOREIGN PATENTS

| 263,103 | Switzerland | Nov. 1, 1949 |